Nov. 18, 1969   R. W. SUMAN ET AL   3,478,699
ACCUMULATING AND SAFETY BUMPER FOR TOW TRUCK SYSTEM
Filed July 21, 1966   4 Sheets-Sheet 1

INVENTORS.
ROBERT W. SUMAN
WILLIAM D. STODDART
HORACE M. SWARTZ

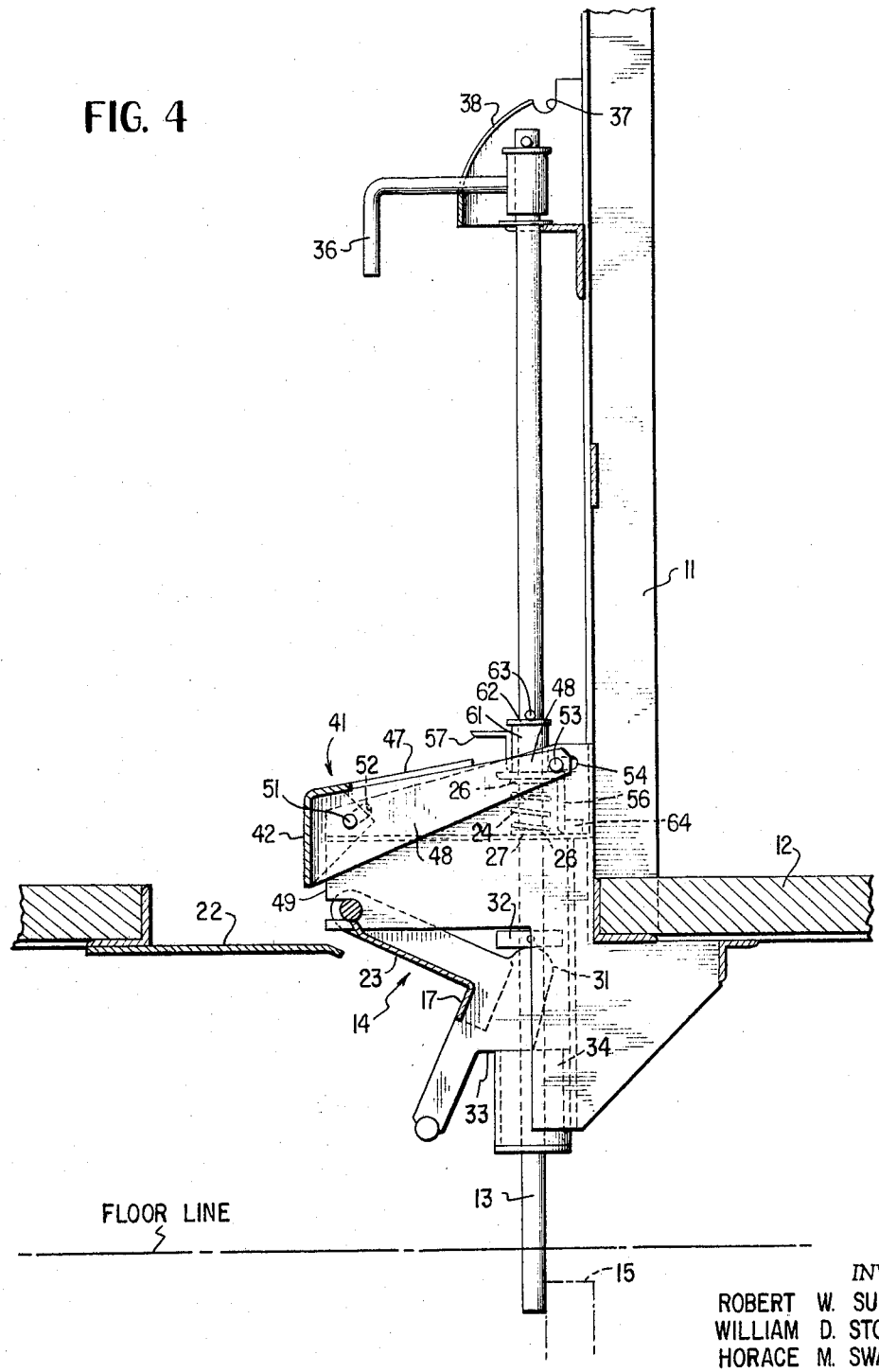

Nov. 18, 1969  R. W. SUMAN ETAL  3,478,699
ACCUMULATING AND SAFETY BUMPER FOR TOW TRUCK SYSTEM
Filed July 21, 1966  4 Sheets-Sheet 4

INVENTORS.
ROBERT W. SUMAN
WILLIAM D. STODDART
HORACE M. SWARTZ

United States Patent Office 3,478,699
Patented Nov. 18, 1969

3,478,699
ACCUMULATING AND SAFETY BUMPER FOR TOW TRUCK SYSTEM
Robert W. Suman, Hatboro, William D. Stoddart, Ambler, and Horace M. Swartz, Doylestown, Pa., assignors to FMC Corporation, a corporation of Delaware
Filed July 21, 1966, Ser. No. 566,903
Int. Cl. B61b 7/08, 7/14; B61c 11/02
U.S. Cl. 104—178                                     15 Claims

ABSTRACT OF THE DISCLOSURE

A bumper for a tow truck employed in a tow truck system which provides for the disengagement of the truck from the towing line by the preceding truck when it is desired to accumulate trucks at one section of the tow system and which also provides for disengagement of the truck from the towing line whenever the truck strikes an obstruction. The tow truck includes a first bumper means mounted on the forward end thereof; the first bumper being operatively connected to a tow pin on the truck for moving the pin to an inoperative position whenever the first bumper means engages with a rear bumper on the preceding truck. The tow truck also includes a second bumper means having a manually resettable, spring biased latch mechanism. Whenever the second bumper means contacts an obstruction along the towing line, it is shifted rearwardly to unlatch the latch mechanism allowing the latter to move the tow pin to an inoperative position under the influence of the spring.

---

This invention relates to the art of tow truck systems such as those which are employed in warehouses, freight terminals and the like. More specifically the invention involves an improved bumper for a floor truck which provides for the disengagement of the truck from the towing line by the preceding truck when it is desired to accumulate trucks at one section of the towing line layouts and which also provides for disengagement of the truck from the tow line whenever the truck strikes an obstruction.

STATE OF THE PRIOR ART

Floor trucks of the present invention are the type which are moved along the warehouse floor by a tow line which may be enclosed in a slot in the floor of the warehouse. These under-the-floor tow lines have propelling dogs attached thereto which engage with a driving pin extending through the slot in the floor and which is attached to the truck. Generally, such systems have powered main tow lines in a floor slot with the propelling dogs spaced along the lines and moving along within the slot. In presently available systems bumpers may be provided on each floor truck to enable a number of such trucks to be accumulated at a given point on the tow line. These bumpers generally operate upon engagement with a stalled preceding floor truck to elevate the driving pin, which extends downwardly through the guide slot in the floor, from an operative to an inoperative position. In the inoperative position the driving pin is disengaged from the propelling dogs on the tow line, and the truck comes to a halt. By stopping one truck at a desired point, the operator may accumulate any number of trucks at that point.

However, since the preceding trucks do not present a very large rear area for actuating the disengaging mechanism, the rear portion of the trucks frequently are equipped with a special bumper device for this function. However, not infrequently, an obstruction other than a preceding truck blocks the path of a truck. If the obstruction does not actuate the disengaging mechanism, serious damage to the obstruction, the truck and/or the tow line may result. Thus, a safety bumper device may be incorporated in the truck to assure disengagement of the truck from the towing line if an obstruction is encountered.

OBJECTS

It is a principal object of the invention to provide an improved bumper arrangement for a floor truck to be used in tow line system which enables accumulation of trucks at a point along the tow line and which also incorporates a separate bumper mechanism for disengaging the truck if the truck strikes an obstruction other than a preceding truck.

A further object of the present invention is to provide a simple, inexpensive floor truck bumper construction produced with a minimum of moving parts and which is rugged and reliable in its operation with facilities for truck accumulation and for stopping the truck when an obstruction blocks the path of the truck.

SUMMARY

Generally, the invention comprises a material handling system including at least two material handling vehicles. Facilities are provided for advancing, either in unison or separately the vehicles one after the other in the same predetermined path. The leading vehicle includes a rearwardly extending bumper plate at the tail end of the vehicle. The trailing vehicle has a first bumper device on its forward end. If the trailing vehicle approaches too close to the leading vehicle, the rearwardly extending bumper plate strikes the first bumper device, and the trailing vehicle is then temporarily disengaged from the advancing facilities. If the vehicles are again separated, as by advancing of the leading vehicle relative to the trailing vehicle, the trailing vehicle is automatically reengaged with the advancing facilities. The trailing vehicle also has a second bumper device mounted on its forward end. This device disengages the trailing vehicle from the advancing facilities if said vehicle contacts an obstacle other than the leading vehicle. Once the second bumper device is actuated it must be manually reset before further advancement of the trailing vehicle is possible.

DRAWINGS

Other preferred features of the present invention will appear from the following description of a representative embodiment thereof, disclosed in the accompanying drawings in which:

FIG. 4 is a cross-sectional view taken along line 4—4 of FIG. 3;

DESCRIPTION OF THE INVENTION

Figure 1:
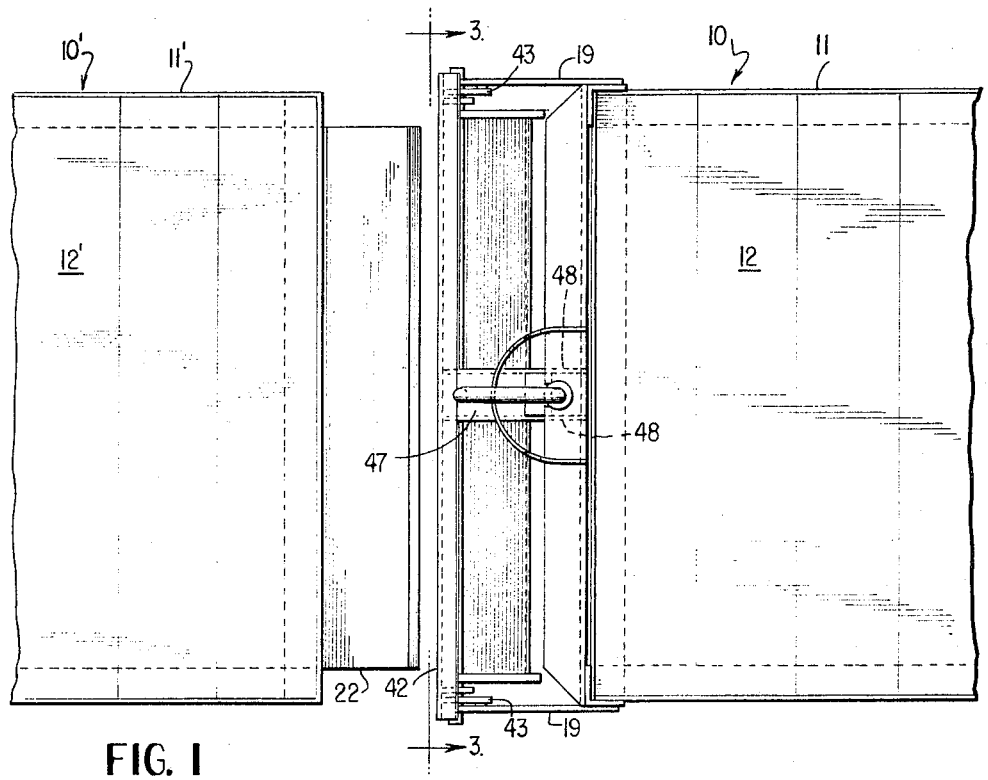
FIG. 1 is a plan view of the rear bumper plate of a leading truck (left) and the forward bumper arrangement of a trailing truck (right)

Referring to FIG. 1, there is shown a leading material handling truck 10' and a trailing material handling truck 10. Actually, each truck used in the tow truck system usually will be similar in construction so that the bumper arrangement will operate as between all trucks of the system. In showing the invention the rear portion of a leading truck 10' and the forward portion of a trailing truck 10 are shown. Each truck has the usual vehicle body comprised of frames 11' and 11 which support material carrying platforms 12' and 12. The bodies of the trucks are mounted on floor engaging wheels (not shown). Each truck is provided with a driving pin 13 (only one shown) which is drivingly engagable with a propelling dog 15 (FIGS. 2, 4, 5 and 6) mounted on the usual tow line that is enclosed within a slot in the warehouse floor.

The portion of the trailing truck 10, as illustrated, is provided at its front end with an accumulator bumper mechanism referred to generally as 14. The bumper arrangement 14 is associaed with the driving pin 13 to raise it to an inoperative position out of engagement with the propelling dog 15 (FIGS. 5 and 6) on the tow line when the truck 10 strikes either a preceding truck 10' or an obstruction 60. In the former case (FIG. 5) it is desirable that upon the removal of the preceding truck 10' the driving pin 13 of the trailing truck 10 be automatically engaged again with the tow line for further advancement. However, if the truck 10 is stopped by an obstruction (FIGURE 6), it is desirable that the driving pin 13 require manual resetting. For this purpose, a reset mechanism 16 is provided which must be manually reset when the truck 10 strikes an obstruction other than a preceding truck.

Figure 2:
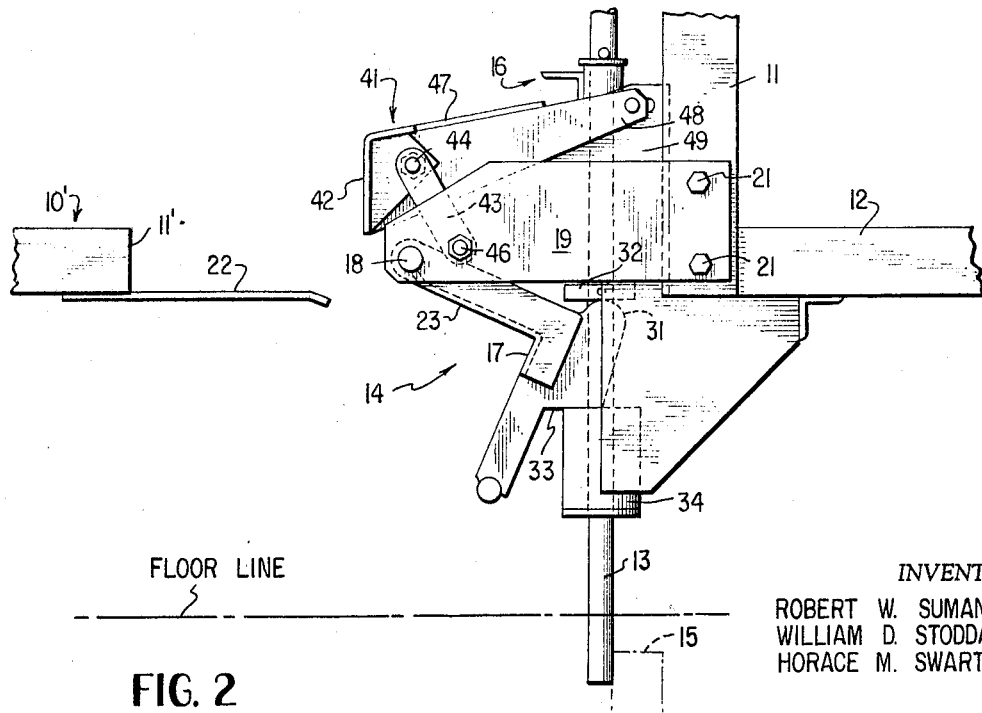
FIG. 2 is an enlarged side elevational view of the equipment shown in FIG. 1.
Figure 3:
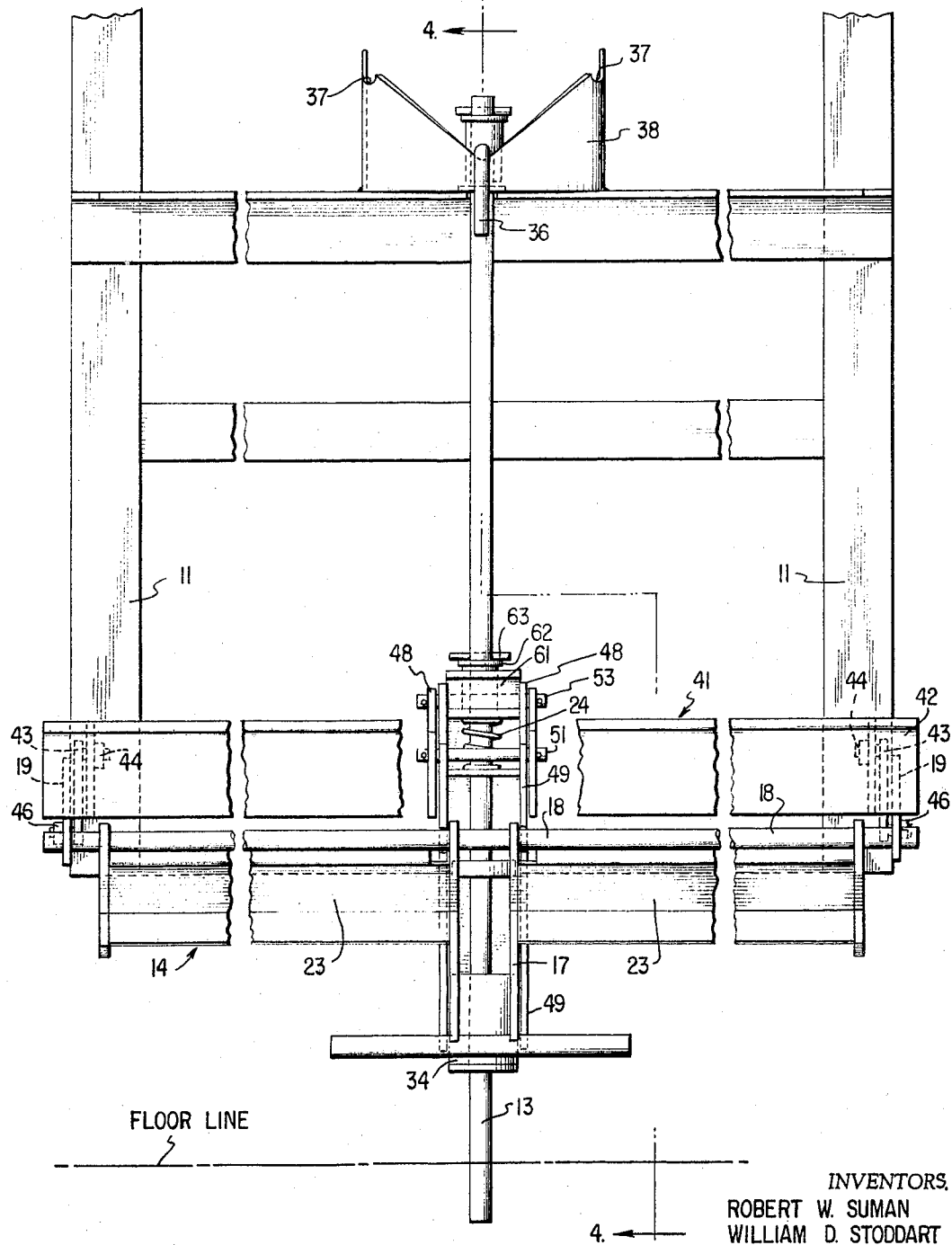
FIG. 3 is a front elevational view of the trailing truck taken along line 3—3 of FIG. 1 with portions removed for better illustration of details.
Figure 6:
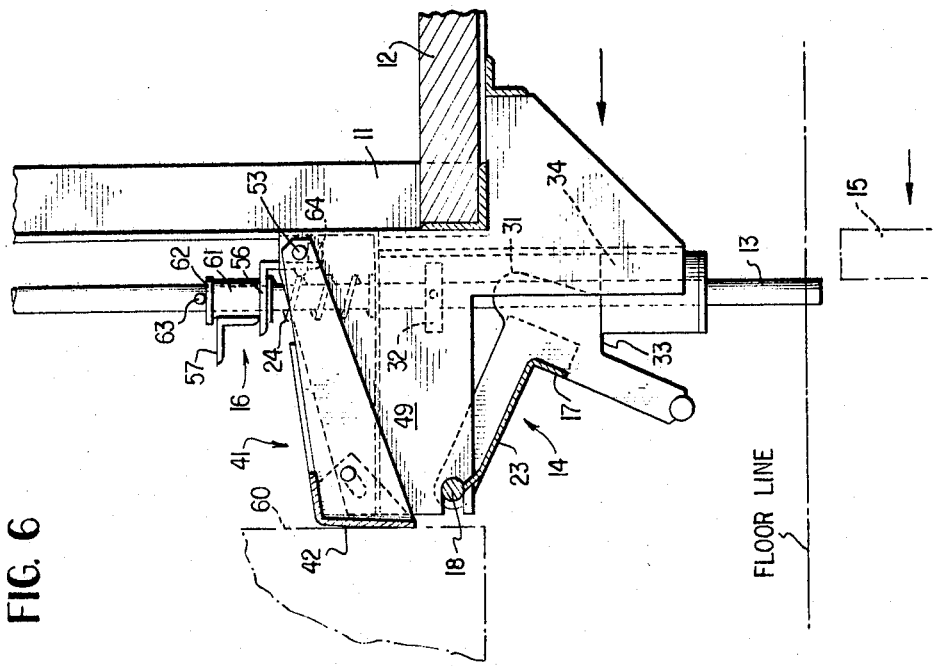
FIG. 6 is a view similar to FIG. 4 with portions removed and showing the disengaging mechanism actuated by an obstruction other than a leading car.

In FIGURES 2–4 there is shown in detail the bumper arrangement 14, which includes an angularily shaped actuator 17. The actuator 17 is pivotally mounted on a rod 18 which is supported between two end brackets 19—19 (FIGURE 3). The brackets 19—19 are connected to the frame 11 by bolts 21—21 (FIGURE 2). The portion of the preceding truck 10' as illustrated is provided with a rearwardly extending bumper plate 22 which engages with the under surface of arm 23 of the actuator 17.

A compression spring 24 (FIGURE 4) is mounted between a portion of the reset mechanism 16 (described more fully hereinafter) and an extension 26 of the frame 11. With the reset mechanism 16 in the locked position shown in FIGURE 4, the drive pin 13 is in its lowered position in engagement with the dog 15 as long as actuator 17 is also disposed as shown in FIGURE 4.

Figure 5:
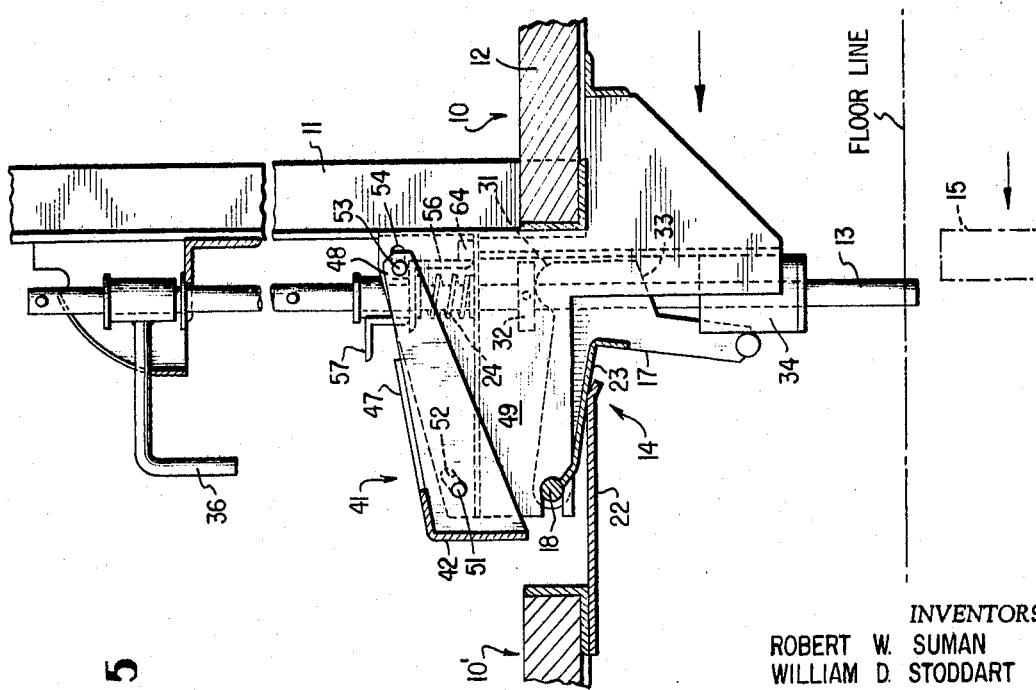
FIG. 5 is a view similar to FIG. 4 with portions removed and showing a disengaging mechanism of the trailing truck actuated by the rear bumper plate of a leading truck.

When the bumper 22 passes in under the arm 23, the arm is raised and consequently actuator 17 is rotated in a counterclockwise direction (FIGURES 2 and 5).

An extension 31 on actuator 17 is positioned to underlie a washer 32 which is pinned to the drive pin 13. Thus, the actuator 17 moves the drive pin 13 upward to disengage the drive pin 13 from the dog 15 when the bumper plate 22 and the arm 23 comes into contact and actuator 17 is pivoted to the position shown in FIGURE 5. When the bumper plate 22 is removed, as by advancement of the preceding truck 10' relative to the trailing truck 10, the actuator 17 returns by gravity to the position shown in FIGURES 2 and 4 and the drive pin 13 thereupon drops to be reengaged with the dog 15. Both of these movements occur due to gravity alone.

The actuator 17 also has a shoulder 33 on the underside of extension 31 which rests on a shock bushing 34 when the drive pin 13 is in the operative truck driving position. The shock bushing 34 cushions the movement of the actuator 17 as it returns to the position shown in FIGURE 4. The drive pin 13 also has a handle 36 at its upper end for manually moving the drive pin 13 out of engagement with one of the propelling dogs 15. The handle can be retained in the raised position for pin 13 by its placement in either of the notches 37—37 (FIGURE 3) of a rack 38 mounted near the upper end of truck frame 11.

In addition to the accumulating bumper mechanism operated by actuator 17, the truck bumper arrangement of this invention provides a safety bumper, generally designated 41, for disengaging the drive pin 13 from a dog 15 in case an obstruction other than a preceding car is encountered by the tow truck. The safety bumper 41 includes a bumper bar 42 which is pivotally supported at each end by links 43—43 (FIGURES 1 and 2) and extends across the entire front end of the tow truck. The links 43—43 are connected to the bar 42 by fasteners 44—44; and are connected to the end brackets 19—19 by fasteners 46—46.

The central part of the bumper bar 42 carries a channel shaped member 47 which extends rearwardly (to the right FIGURE 2) and which has downturned flanges 48—48 (FIGURE 1). The member 47 and the bar 42 are integrally connected by welding, for example. The channel shaped member 47 is shiftably engaged with a bracket 49 (FIGURE 4) which extends forwardly from the frame 11. The connection of member 47 to bracket 49 is formed by a rod 51 shiftable in opposed upwardly sloping slots 52—52 in bracket 49, the rod extending through both flanges 48 of the channel shaped member 47. The rear ends of flanges 48—48 carry a similar rod 53 which is received in opposed horizontal slots 54—54 in bracket 49. The rods 51 and 53 may be held in place by cotter pins (not shown) at the opposite ends thereof. Thus, the channel shaped member 47 and the bumper bar 42 are movable in a direction determined by the disposition of slots 52—52 and 54—54.

Under normal conditions the weight of the bumper bar 42 of safety bumper 41 causes the bumper to assume the position shown in FIGURE 4 wherein the rods 51 and 53 are in the forwardmost positions of slots 52—52 and 54—54, respectively. In this position the rod 53 serves to hold the reset mechanism 16 in its down position wherein the spring 24 is compressed and the drive pin 13 is free to be engaged with the dog 15 assuming that actuator 17 of the accumulating bumper mechanism is not in operated position. In particular, the reset assembly 16 (FIGURE 4) includes a first angle piece 56 which serves as a latch; and a second piece of angle iron 57 which serves as a reset handle. The two elements 56 and 57 are integrally connected by welding, for example. The latch 56 in its locked position shown in FIGURE 4 is held beneath the rod 53 against the upward biasing force of compression spring 24.

When an obstruction, such as 60 (FIGURE 6), strikes the bumper bar 42 the entire safety bumper 41, including the rod 53 moves rearwardly under the direction of slots 52—52 and 54—54 and end links 43—43. The latch 56 thereupon is freed from beneath rod 53 and moves upwardly under the force of the spring 24.

A sleeve 61 having a flange 62 at the upper end is mounted between the latch 56 and a roll pin 63, this pin being secured to drive pin 13. The upward movement of the latch 56 raises the sleeve 61. This then raises the drive pin 13 out of engagement with the dog 15, terminating further advancement of the truck 10. A limit stop 64 extending horizontally from the base of the latch 56, strikes rod 53 to limit upward travel of drive pin 13. In order for the truck to be started again, the reset handle formed by angle iron 57 must be manually depressed against the force of spring 24. This permits the safety bumper 41 including bumper bar 42 and member 47 to move down and to the left (FIGURE 6) so that the latch 56 is reset under rod 53. Also, the drive pin 13 is lowered by this operation and thus again moves into engagement with the dog 15, and the spring 24 is compressed for a subsequent tripping action of the safety bumper.

In operation, the truck 10 is advanced along a predetermined path in a warehouse by a dog 15 of a tow line. If the truck 10 approaches a preceding truck 10' (FIGURE 5) the rear bumper 22 of that truck slides beneath arm 23 of actuator 17 to disengage the drive pin 13 from the dog 15. If the preceding truck 10' is thereafter advanced away from truck 10, the weight of the drive pin 13 lowers the pin until the roll pin 63 strikes the flange 62.

In this position the drive pin 13 is engaged with the propelling dog 15.

On the other hand, if the truck 10 collides with an obstruction 60 (FIGURE 6), the safety bumper 41 releases the latch 56 allowing the spring 24 to raise the drive pin 13 to its disengaged position. In order for the truck to be advanced again, the reset handle i.e. angle iron 57, must be depressed to reset the latch 56 under the rod 53. This compresses the spring 24 and lowers the drive pin 13 into engagement with a propelling dog 15.

It is to be understood that the form of this invention herewith shown and described is to be taken as a preferred example of the same, and that various changes in the shape, size and arrangement of the parts may be resorted to without departing from the spirit of the invention.

What is claimed is:

1. A material handling floor truck for use with a tow truck system comprising:
    a wheel supported vehicle body for carrying material to be transferred within the tow truck system, said vehicle body having a rear bumper member on the tail end thereof;
    a drive pin connected to said vehicle body to be vertically movable from an operative to an inoperative position said drive pin in said operative position being disposed to engage a powered tow line of the tow truck system to propel said truck in said inoperative position being located to be disengaged from the tow line;
    first bumper means mounted on the forward end of said vehicle body said first bumper means being operatively connected to said drive pin to move said pin from said operative to said inoperative position when said first bumper means engages with the rear bumper member on a preceding material handling floor truck and retain the drive pin in said inoperative position during such engagement; and
    second bumper means mounted on the forward end of said vehicle body and exposed at the front of the vehicle body to be engaged by an obstruction disposed in the path of movement of the floor truck through the tow truck system, said second bumper means being connected to said drive pin through a manually resettable mechanism which is actuated upon said second bumper means being engaged by an obstruction to move said drive pin from said operative to said inoperative position, said drive pin being retained in said inoperative position until said mechanism is manually reset.

2. A material handling floor truck as recited in claim 1 wherein:
    said rear bumper member extends generally horizontally rearwardly of the tail end of said vehicle body providing a generally upwardly facing surface thereon; and
    said first bumper means includes a pivotally mounted actuator and means operatively connecting said actuator to said drive pin said actuator providing a generally downwardly facing surface which slidably engages with the upwardly facing surface of the rear bumper member on a preceding material handling floor truck when two floor trucks approach each other, such slidable engagement acting to pivot said actuator upwardly and move said pin from said operative to said inoperative position.

3. A material handling floor truck as recited in claim 2 wherein;
    said actuator extends across a substantial portion of the width of said vehicle body and is pivotally mounted adjacent the forwardmost portion of said body with said downwardly facing surface extending rearwardly from said pivotal mounting.

4. A material handling floor truck as recited in claim 2 wherein;
    said second bumper means is disposed above and exposed forwardly of said first bumper means and includes a bumper bar extending across substantially the entire width of the front end of said vehicle body, said bumper bar bieng shiftable rearwardly relative to the vehicle body upon encountering an obstruction to actuate said manually resettable mechanism.

5. A material handling floor truck as recited in claim 1 wherein;
    said mechanism includes biasing means associated with said drive pin to hold said drive pin in said inoperative position, and latch means operable to keep said biasing means effective to hold said drive pin in said inoperative position, said second bumper means being operable upon encountering an obstruction release said latch means from keeping said biasing means ineffective.

6. A material handling floor truck as recited in claim 5 wherein;
    said mechanism further includes a manually engagable handle portion movable to permit reengagement of said latch means and movement of said drive pin to operative position, said latch means moving with said second bumper means under the force of gravity to reset said mechanism upon movement of said handle portion.

7. A material handling floor truck as recited in claim 5 wherein:
    said second bumper means includes a bumper bar extending across substantially the entire width of the front end of said vehicle, and links pivotally connecting the opposite ends of said bar body to permit rearward shifting of said bar relative to said body; and
    said latch means includes a member secured to shift with said bumper bar, said member being guided by horizontal slots attached to said vehicle body in moving between the latched and unlatched conditions for said biasing means.

8. A material handling floor truck for use with a tow truck system comprising:
    a wheel supported vehicle body for carrying material to be transferred within the tow truck system;
    a drive pin connected to said vehicle body to be vertically movable from an operative to an inoperative position, said drive pin in said operative position being disposed to engage a powered tow line of the tow truck system to propel said truck and in said inoperative position being located to be disengaged from the tow line;
    safety bumper means mounted on the forward end of said vehicle body and being exposed at the front of the vehicle body to be engaged by an obstruction disposed in the path of movement of the floor truck through the tow truck system, said safety bumper means including a bumper bar extending across substantially the entire width of the front end of said vehicle body, and links pivotally connecting the opposite ends of said bar to said body to permit rearward shifting of said bar relative to said body; and
    a manually resettable mechanism connecting said bumper means to said drive pin, said mechanism being actuated upon said bumper means being engaged by an obstruction to move said drive pin from said operative to said inoperative position, said drive pin being retained by said mechanism in said inoperative position until said mechanism is manually reset, said mechanism including biasing means associated with said drive pin to hold said drive pin in said inoperative position, and latch means operable to keep said biasing means ineffective to hold said drive pin in said inoperative position, said safety bumper means being operable upon encountering an obstruction to release said latch means for keeping said biasing means ineffective, said latch means including a rod secured to shift with said bumper bar, said rod being guided by horizontal slots attached to said vehicle body in moving between latch and unlatched conditions for said biasing means, and said rod of the latch means being engageable with a limit stop in its unlatched position to restrict the upward movement of said drive pin caused by said spring biasing means.

9. A material handling floor truck for use with a tow truck system comprising:

a wheel supported vehicle body for carrying material to be transferred within the tow truck system, said vehicle body having a rear bumper member extending generally horizontally rearwardly of the tail end of said vehicle body and providing a generally upwardly facing surface thereon;

a drive pin connected to said vehicle body to be vertically movable from an operative to an inoperative position, said drive pin in said operative position being disposed to engage a powered tow line of the tow truck system to propel said truck and in said inoperative position being located to be disengaged from the tow line; and accumulating bumper means mounted on the forward end of said vehicle body, said bumper means including a pivotally mounted actuator and means connecting said actuator to said drive pin, said actuator being pivotally mounted adjacent the forwardmost portion of said vehicle body and providing a generally downwardly facing surface extending rearwardly from said pivotal mounting which slidably engages with the upwardly facing surface of the rear bumper member on a preceding material handling floor truck when two floor trucks approach each other, such slidable engagement acting to pivot the rear portion of said actuator upwardly about and behind its pivotal mounting and move said pin from said operative to said inoperative position.

10. A material handling floor truck as recited in claim 9 wherein;

said actuator extends across a substantial portion of the width of said vehicle body and is pivotally mounted adjacent the forward most portion of said body with said downwardly facing surface extending rearwardly from such pivotal mounting.

11. A material handling floor truck for use with a tow truck system comprising:

a wheel supported vehicle body for carrying material to be transferred within the tow truck system;

a drive pin conncted to said vehicle body to be vertically movable between an operative and an inoperative position, said drive pin in said operative position being disposed to engage a powered tow line of the tow truck system to propel said truck and in said inoperative position being located to be disengaged from the tow line;

safety bumper means mounted on the forward end of said vehicle body and being exposed at the front of the vehicle body to be engaged by an obstruction disposed in the path of movement of the floor truck through the tow truck system, said bumper being shiftable rearwardly relative to said vehicle body upon encountering an obstruction;

a manually resettable mechanism structurally interrelated with said drive pin to cause the latter to move to its inoperative position while permitting said drive pin to be moved to said inoperative position independently of said mechanism when said mechanism is latched against moving said drive pin, said mechanism including a latch member and biasing means for urging the mechanism to move said drive pin to its inoperative position;

rod means secured to shift with said bumper means, said rod means normally engaging said latch member for holding said mechanism in a position to allow said pin to assume its operative position, rearward shifting of said bumper means acting to move said rod means out of engagement with said latch member freeing said mechanism to move under the influence of said biasing means.

12. A material handling truck as recited in claim 11 wherein; said safety bumper means includes a bar extending across substantially the entire width of the front end of said vehicle body.

13. A material handling truck as recited in claim 12 wherein:

said safety bumper means includes links pivotally connecting the opposite end of said bar to said vehicle body to permit rearward shifting of said bar relative to said body;

said rod means being guided by horizontal slots attached to said vehicle body in moving between engaging and non-engaging conditions for said mechanism.

14. A material handling truck as recited in claim 11 wherein:

a manually engageable handle portion is provided to be movable to permit re-engagement of said rod means with said latch member and movement of said drive pin to its operative position, said rod means moving with said safety bumper means under the force of gravity to reset said mechanism upon movement of said handle portion.

15. A material handling truck as recited in claim 11 wherein said rod means engages a limit stop in its non-engaging position to restrict the movement of said drive pin caused by said biasing means urging said mechanism and said drive pin to said inoperative position.

References Cited

UNITED STATES PATENTS

| | | | |
|---|---|---|---|
| 3,119,347 | 1/1964 | Dehne | 104—172 |
| 3,315,614 | 4/1967 | Braun | 104—178 |

ARTHUR L. LA POINT, Primary Examiner

D. F. WORTH III, Assistant Examiner